US009272952B2

(12) United States Patent
Choi et al.

(10) Patent No.: US 9,272,952 B2
(45) Date of Patent: Mar. 1, 2016

(54) ADMIXTURE COMPOSITION FOR A TILE CEMENT MORTAR AND A TILE CEMENT MORTAR COMPOSITION COMPRISING THE SAME

(75) Inventors: Nak Woon Choi, Daejeon (KR); Sung Hoon Kim, Daejeon (KR); Eun Jeong Kim, Daejeon (KR)

(73) Assignee: SAMSUNG FINE CHEMICALS CO., LTD. (KR)

( * ) Notice: Subject to any disclaimer, the term of this patent is extended or adjusted under 35 U.S.C. 154(b) by 836 days.

(21) Appl. No.: 13/521,599

(22) PCT Filed: Jan. 12, 2011

(86) PCT No.: PCT/KR2011/000200
§ 371 (c)(1),
(2), (4) Date: Jul. 11, 2012

(87) PCT Pub. No.: WO2011/087261
PCT Pub. Date: Jul. 21, 2011

(65) Prior Publication Data
US 2012/0289627 A1 Nov. 15, 2012

(30) Foreign Application Priority Data
Jan. 12, 2010 (KR) ........................ 10-2010-0002765

(51) Int. Cl.
| | | |
|---|---|---|
| C04B 7/32 | (2006.01) | |
| C04B 14/06 | (2006.01) | |
| C04B 14/28 | (2006.01) | |
| C04B 22/00 | (2006.01) | |
| C04B 20/00 | (2006.01) | |
| C04B 22/14 | (2006.01) | |
| C04B 24/26 | (2006.01) | |
| C04B 24/38 | (2006.01) | |
| C04B 28/02 | (2006.01) | |
| C04B 40/00 | (2006.01) | |
| C04B 103/00 | (2006.01) | |
| C04B 111/00 | (2006.01) | |

(52) U.S. Cl.
CPC . *C04B 28/02* (2013.01); *C04B 7/32* (2013.01); *C04B 14/06* (2013.01); *C04B 14/28* (2013.01); *C04B 20/008* (2013.01); *C04B 22/0093* (2013.01); *C04B 22/147* (2013.01); *C04B 24/2641* (2013.01); *C04B 24/2652* (2013.01); *C04B 24/383* (2013.01); *C04B 40/0039* (2013.01); *C04B 2103/0057* (2013.01); *C04B 2111/00672* (2013.01)

(58) Field of Classification Search
CPC ...... C04B 28/02; C04B 40/0039; C04B 7/32; C04B 20/008; C04B 22/0093; C04B 22/147; C04B 24/2652; C04B 24/383; C04B 14/06; C04B 14/28; C04B 24/2641; C04B 2111/00672; C04B 2103/0057
USPC .......................................................... 524/5
See application file for complete search history.

(56) References Cited

U.S. PATENT DOCUMENTS

| 4,845,207 A | 7/1989 | t'Sas |
| 2005/0241539 A1 | 11/2005 | Hagen et al. |
| 2005/0241540 A1 | 11/2005 | Hohn et al. |

FOREIGN PATENT DOCUMENTS

| EP | 2524960 A2 | 11/2012 |
| FR | 2374391 A1 | 7/1978 |
| JP | 198516849 A | 1/1985 |
| JP | 1986247650 A | 11/1986 |
| JP | 04092845 A | 3/1992 |
| JP | 05201756 A | 8/1993 |
| JP | 2000103662 A | 4/2000 |
| JP | 2003252669 A | 9/2003 |
| JP | 2007277017 A | 10/2007 |
| JP | 2009126761 A | 6/2009 |
| KR | 10-1997-0004050 | 3/1997 |
| KR | 10-2002-0009336 | 2/2002 |
| KR | 10-2006-0135919 | 12/2006 |
| KR | 10-2007-0107769 | 11/2007 |
| KR | 10-0881343 | 1/2009 |
| KR | 10-2010-0113814 | 10/2010 |

OTHER PUBLICATIONS

International Search Report—PCT/KR2011/000200 dated Sep. 21, 2011.
Written Opinion—PCT/KR2011/000200 dated Sep. 21, 2011.
Japanese Office Action with English Translation for Application No. 2012-548881 dated May 22, 2014.
Extended European Search Report for Application No. 11733049.8-1351/2524960 dated Apr. 3, 2014.

*Primary Examiner* — Angela C Scott
(74) *Attorney, Agent, or Firm* — Cantor Colburn LLP

(57) ABSTRACT

Disclosed are an admixture composition for a tile cement mortar and a tile cement mortar composition comprising the admixture composition. The disclosed admixture composition for a tile cement mortar comprises a cellulose ether, a polyacrylamide-based polymer coagulant and an inorganic coagulant.

12 Claims, No Drawings

ADMIXTURE COMPOSITION FOR A TILE CEMENT MORTAR AND A TILE CEMENT MORTAR COMPOSITION COMPRISING THE SAME

TECHNICAL FIELD

The present invention relates to an admixture composition for a tile cement mortar and a tile cement mortar composition including the admixture composition, and more particularly, to an admixture composition for a tile cement mortar including a cellulose ether, a polyacrylamide-based polymer coagulant, and an inorganic coagulant, and a tile cement mortar including the admixture composition.

BACKGROUND ART

Tiles have long been used as a finishing material for construction of buildings with a beautiful external appearance, convenience for installation, hygienic properties, convenience for cleaning, maintaining, and managing buildings, and the like, and the use of tiles has increased, recently.

Tile adhesives used to adhere tiles to walls or floors are classified into cement mortar-based adhesives, resin-based adhesives, and emulsion-based adhesives according to the type of major binding material. Among theses adhesives, cement mortar-based adhesives, which are typically referred to as tile cement mortar, have been widely used due to their economic efficiency and use convenience.

The tile cement mortar should have excellent sag resistance, long open time, and high adhesive strength. The sag resistance and adhesive strength become more important as large-sized tiles are used as finishing materials for buildings. Particularly, since construction costs are closely related to labor costs rather than material costs, open time plays an important role in construction by reducing a construction period.

In order to increase the open time, an amount of cement may be reduced, aggregates with a large particle size may be used, and/or asbestos may be used. However, when the amount of cement is reduced, adhesive strength decreases. Also, aggregates with a large particle size are not suitable for modern styles of tile installation by which a very thin layer of tile cement mortar is formed. Furthermore, the use of asbestos is prohibited due to toxicity.

In addition, a method of extending open time by adding organic and/or inorganic cement hydration retarders to a cement mortar has been widely used. According to this method, a surplus water in the cement mortar can be preserved for a long period of time by delaying the hydration of the cement, and hardening of the surface of the cement mortar, which is caused by a hydrate of the cement, can be prevented, so that open time is extended. However, although wetting capability of the cement mortar can be improved, adhesive strength thereof with respect to a substrate such as cement concrete deteriorate according to this method.

DETAILED DESCRIPTION OF THE INVENTION

Technical Problem

The present invention provides an admixture composition for a tile cement mortar including a cellulose ether, a polyacrylamide-based polymer coagulant, and an inorganic coagulant.

The present invention also provides a tile cement mortar composition including the admixture composition.

Technical Solution

According to an aspect of the present invention, there is provided an admixture composition for a tile cement mortar including a cellulose ether, a polyacrylamide-based polymer coagulant, and an inorganic coagulant.

The cellulose ether may include at least one selected from the group consisting of alkyl cellulose, hydroxyalkyl alkyl cellulose, and hydroxyalkyl cellulose.

The cellulose ether may include at least one selected from the group consisting of methyl cellulose, hydroxypropyl methyl cellulose, hydroxyethyl methyl cellulose, ethyl hydroxyethyl cellulose, and hydroxyethyl cellulose.

A viscosity of an aqueous solution of the cellulose ether with a concentration of 2 (w/v) % which is measured using a Brookfield viscometer may be in the range of 10 to 200,000 cps at 20° C. and 20 rpm.

The content of the cellulose ether may be in the range of 15 to 69% by weight.

The polyacrylamide-based polymer coagulant may include at least one compound selected from the group consisting of a nonionic polyacrylamide, a cationic polyacrylamide, and an anionic polyacrylamide.

The polyacrylamide-based polymer coagulant may include at least two types of polyacrylamide-based polymer coagulants with different average particle diameters.

The polyacrylamide-based polymer coagulant may include a small particulate polyacrylamide-based polymer coagulant having an average particle diameter in the range of 20 to 100 μm and a large particulate polyacrylamide-based polymer coagulant having an average particle diameter in the range of 150 to 250 μm in a weight ratio of 20:80 to 80:20.

The content of the polyacrylamide-based polymer coagulant may be in the range of 0.2 to 10% by weight in the admixture composition.

The inorganic coagulant may include at least one compound selected from the group consisting of sodium aluminate, calcium aluminate, and aluminum sulfate.

The content of the inorganic coagulant may be in the range of 21 to 85% by weight in the admixture composition.

According to another aspect of the present invention, there is provided a tile cement mortar composition including a cement and the admixture composition.

The content of the admixture composition may be in the range of 0.2 to 2% by weight in the tile cement mortar composition.

Advantageous Effects

When the admixture composition including the cellulose ether, the polyacrylamide-based polymer coagulant, and the inorganic coagulant according to an embodiment of the present invention is applied to the tile cement mortar, open time is extended due to an excellent wetting property of the tile cement mortar, water demand is increased so that an working area increases and the consumption of materials decreases to allow the manufacturing process to be economical, sag resistance of the tile cement is improved due to low friction between aggregates which is caused by the increase in water demand to simplify the working process, and quality may be easily controlled with stable working hours due to low reduction in sag resistance during a remixing process.

Mode of the Invention

Hereinafter, an admixture composition for a tile cement mortar according to exemplary embodiments of the present invention will be described in detail.

An admixture composition for a tile cement mortar according to an embodiment of the present invention includes a cellulose ether, a polyacrylamide-based polymer coagulant, and an inorganic coagulant.

The cellulose ether may include at least one selected from the group consisting of alkyl cellulose, hydroxyalkyl alkyl cellulose, and hydroxyalkyl cellulose. For example, the cellulose ether may include at least one selected from the group consisting of methyl cellulose, hydroxypropyl methyl cellulose, hydroxyethyl methyl cellulose, ethyl hydroxyethyl cellulose, and hydroxyethyl cellulose. The methyl cellulose has a degree of substitution of methyl group ($CH_3$) of 27 to 32%; the hydroxypropyl methyl cellulose has a degree of substitution of methyl group ($CH_3$) of 20 to 31% and a degree of substitution of hydroxypropyl group (HPO) of 1 to 11%; the hydroxyethyl methyl cellulose has a degree of substitution of methyl group ($CH_3$) of 20 to 31% and a degree of substitution of hydroxyethyl group (HEO) of 1 to 12%; the ethyl hydroxyethyl cellulose has a degree of substitution of hydroxyethyl group (HEO) of 40 to 70%; and the hydroxyethyl cellulose has a degree of substitution of hydroxyethyl group (HEO) of 40 to 70%. The 'degree of substitution of the methyl group and the other substituent groups' used herein refers to a ratio of the total atomic weight of elements constituting each substituent to the total atomic weight of elements constituting a repeating unit of the substituted cellulose, as shown in the following formula. Hereinafter, the expressions have the same meaning.

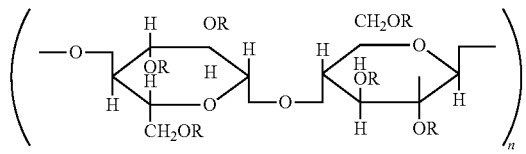

In the formula, R's are each independently $-CH_3$, $-CH_2CH_3$, $-CH_2CH_2OH$, or $-CH_2CHOHCH_3$, and n is an integer of 1 or greater.

A viscosity of an aqueous solution of the cellulose ether with a concentration of 2 (w/v) % measured using a Brookfield viscometer at 20° C. and 20 rpm may be in the range of 10 to 200,000 cps (centipoise), for example, 2,000 to 120,000 cps. If the viscosity of the aqueous solution of the cellulose ether is less than 10 cps, desirable thickening effect cannot be obtained. On the other hand, if the viscosity of the aqueous solution of the cellulose ether is greater than 200,000 cps, workability deteriorates due to high viscosity.

The content of the cellulose ether may be in the range of 15 to 69% by weight, for example, 30 to 50% by weight, in the admixture composition. If the content of the cellulose ether is less than 15% by weight, water retention capacity decreases, so that desirable strength of the tile cement mortar cannot be obtained. On the other hand, if the content of the cellulose ether is greater than 69% by weight, the contents of the polyacrylamide-based polymer coagulant and the inorganic coagulant are relatively low, so that water demand cannot be increased when the admixture composition is applied to the tile cement mortar, and manufacturing costs increase.

The polyacrylamide-based polymer coagulant may include at least one compound selected from the group consisting of a nonionic polyacrylamide, a cationic polyacrylamide, and an anionic polyacrylamide.

The polyacrylamide-based polymer coagulant may include at least two types of polyacrylamide-based polymer coagulants with different average particle diameters. For example, the polyacrylamide-based polymer coagulant may include a small particulate polyacrylamide-based polymer coagulant having an average particle to diameter in the range of 20 to 100 μm and a large particulate polyacrylamide-based polymer coagulant having an average particle diameter in the range of 150 to 250 μm in a weight ratio 20:80 to 80:20, for example, 40:60 to 60:40. By using the small particulate polyacrylamide-based polymer coagulant and the large particulate polyacrylamide-based polymer coagulant having the particle size and the amount as described above, an average dissolution rate of the polyacrylamide-based polymer coagulant is properly adjusted in the tile cement mortar, so that reduction in sag resistance of the tile cement mortar occurring during a remixing process may be inhibited. For example, if the content of the small particulate polyacrylamide-based polymer coagulant is less than 20% by weight based on the total weight of the polyacrylamide-based polymer coagulant, the average dissolution rate of the polyacrylamide-based polymer coagulant decreases so that workability deteriorates due to a subsequent viscosity development. On the other hand, if the content of the small particulate polyacrylamide-based polymer coagulant is greater than 80% by weight, the average dissolution rate of the polyacrylamide-based polymer coagulant excessively increases so that the tile cement mortar is not easily mixed at an early stage, and a high sag resistance cannot be maintained during the remixing process. In addition, the content of the polyacrylamide-based polymer coagulant may be in the range of 0.2 to 10% by weight in the admixture composition. If the content of the polyacrylamide-based polymer coagulant is less than 0.2% by weight, it is difficult to obtain desirable sag resistance and increase water demand. On the other hand, if the content of the polyacrylamide-based polymer coagulant is greater than 10% by weight, workability and adhesive strength of the tile cement mortar deteriorate.

The inorganic coagulant may include at least one compound selected from the group consisting of sodium aluminate, calcium aluminate, and aluminum sulfate. In addition, the content of the inorganic coagulant may be in the range of 21 to 85% by weight in the admixture composition. If the content of the inorganic coagulant is less than 21% by weight, water demand cannot be sufficiently increased. On the other hand, if the content of the inorganic coagulant is greater than 85% by weight, the content of the cellulose ether in the admixture composition is relatively low and, water retention capacity decreases, so that the strength of the tile cement mortar, including the is admixture composition, decreases.

According to an embodiment of the present invention, there is provided a tile cement mortar composition including the admixture composition, a cement, and aggregates. The term 'tile cement mortar composition' used herein refers to a dry mix of the admixture composition, the cement, and the aggregates. In addition, the term 'tile cement mortar' used herein refers to that prepared by mixing the tile cement mortar composition with water.

The tile cement mortar having the structures as described above has increased open time and water demand, and the reduction of sag resistance of the tile cement mortar caused by shear stress may be prevented. Hereinafter, open time, water demand, and reduction in sag resistance by shear stress will be described in detail.

Open Time

When a tile cement mortar is applied to a substrate such as cement concrete using a trowel, water contained in the tile cement mortar continuously moves to the substrate and the air by a dryout phenomenon until a tile is adhered thereto. Accordingly, the tile cement mortar hardens and loses its adhesive force with time so as not to be used to adhere the tile to the substrate. As such, the longest period of time during which the tile cement mortar is available for adhering a tile to the substrate from when the tile cement mortar is applied to the substrate is defined as open time. Tile installers prefer a long open time for convenient tile installation.

The open time of the tile cement mortar is directly related to the degree of occurrence of a skinning phenomenon by which a film is formed on the surface of the tile cement mortar with time. In addition, the skinning phenomenon is closely related to a hydration rate of cement and a volume of water retention and/or water retention capacity of the tile cement mortar. In general, as the hydration rate of cement decreases, as the volume of water retention of the tile cement mortar increases, and as the water retention capacity of the tile cement mortar increases, open time increases.

Conventionally, a hydration retarder has been used in order to increase open time by delaying hydration of the cement. However, when the hydration retarder is used, desirable results cannot be easily obtained, and a quality of the tile cement mortar cannot be easily controlled. For example, the hydration rate excessively decreases by a slight change in the amount of the hydration retarder and environmental condition such as temperature or humidity.

Water Demand

In order to extend an open time of the tile cement mortar, an amount of water (for mixing) may be increased. However, if the amount of water is increased without an upper limit, a consistency of a tile cement mortar decreases, and thus, use of the tile cement mortar becomes impossible. Thus, there is a need to efficiently increase the water demand while maintaining consistency.

In order to increase the water demand, (i) a cement with high fineness, (ii) a filler such as fly ash or bentonite, (iii) aggregates with small particle size, and the like may be used. However, since their effect of increasing water demand is not sufficient, a large amount of these materials need to be used to obtain a desirable effect of increasing the water demand.

Although a small amount of the admixture composition for a tile cement mortar according to the current embodiment is added to the tile cement mortar, the water demand of the tile cement mortar may be considerably increased, and open time may be extended.

Reduction in Sag Resistance by Shear Stress

In the installation of tiles, the mixing time of a tile cement mortar may be lengthened according to an ability of workers, and the tile cement mortar needs to be remixed after a period of time. If the mixing time of the tile cement mortar is lengthened or the tile cement mortar is remixed, viscosity of the tile cement mortar decreases, and thus, sag resistance decreases. This phenomenon is referred to as reduction in sag resistance by shear stress. The reduction in sag resistance as described above is caused when a coagulation structure formed between an organic thickener and cement or between an organic thickener and an inorganic filler breaks. Generally, as an initial coagulate force increases and as water demand increases, the reduction in sag resistance increases.

Since a dissolution rate of the admixture composition according to the current embodiment in water is controlled by the polyacrylamide-based polymer coagulant contained therein, the reduction in sag resistance may be inhibited when the tile cement mortar is mixed for a long period of time or remixed.

Meanwhile, as the thickness of the tile cement mortar decreases, the amount of the admixture composition increases to obtain sufficient water retention capacity, and the content of the admixture composition may be in the range of 0.2 to 2% by weight in the tile cement mortar composition. If the content of the admixture composition is less than 0.2% by weight, the effect of the admixture composition is negligible. On the other hand, if the content of the admixture composition is greater than 2% by weight, workability may deteriorate and open time may decrease due to excess water retention capacity.

The cement may be hydraulic cement such as Portland cement, fly ash cement, and aluminous cement, color cement, or the like. If required, the tile cement mortar may also include hemihydrate gypsum, calcium hydroxide, calcium carbonate, and/or clay. The aggregates may be a river sand, a pit sand, quartz sand, or lightweight aggregates, for example, pearlite. The content of the aggregates may be in the range of 30 to 300% by weight based on the weight of the cement.

Hereinafter, one or more embodiments will be described in detail with reference to the following examples. However, these examples are not intended to limit the purpose and scope of the invention.

EXAMPLES

Examples 1-1 to 1-6 and Comparative Examples 1-1 to 1-5

Preparation of Admixture Composition for Tile Cement Mortar

A cellulose ether, a polyacrylamide-based polymer coagulant, and an inorganic coagulant were mixed in a weight ratio listed in Table 1 below to prepare an admixture composition.

Hydroxyethyl methyl cellulose (HEMC) was used as the cellulose ether. The HEMC had a degree of substitution of methyl group of 23% and a degree of substitution of hydroxyethyl group of 8.5%, and a viscosity of an aqueous solution thereof with a concentration of 2 (w/v) % measured using a Brookfield viscometer at 20° C. and 20 rpm was 25,000 cps.

TABLE 1

|  | Cellulose ether (% by weight) HEMC | Polymer coagulant (% by weight) | | Inorganic coagulant (% by weight) Sodium aluminate |
|---|---|---|---|---|
|  |  | Small particulate polyacrylamide*1 | Large particulate polyacrylamide*2 |  |
| Example 1-1 | 30 | 1 | 2 | 67 |
| Example 1-2 | 30 | 2 | 1 | 67 |
| Example 1-3 | 50 | 2 | 1 | 47 |
| Example 1-4 | 50 | 1 | 2 | 47 |
| Example 1-5 | 30 | 3 | 0 | 67 |
| Example 1-6 | 30 | 0 | 3 | 67 |
| Comparative Example 1-1 | 100 | 0 | 0 | 0 |
| Comparative Example 1-2 | 10 | 40 | 50 | 0 |
| Comparative Example 1-3 | 10 | 0 | 0 | 90 |

TABLE 1-continued

| | Cellulose ether (% by weight) HEMC | Polymer coagulant (% by weight) | | Inorganic coagulant (% by weight) Sodium aluminate |
|---|---|---|---|---|
| | | Small particulate poly-acrylamide*[1] | Large particulate polyacrylamide*[2] | |
| Comparative Example 1-4 | 40 | 0 | 0 | 60 |
| Comparative Example 1-5 | 95 | 2 | 3 | 0 |

*[1]anionic, a viscosity of 4,000 cps in a 1 (w/v)% aqueous solution measured using a Brookfield viscometer at 20° C. and 20 rpm, and an average particle diameter of 63 μm.
*[2]anionic, a viscosity of 4,000 cps in a 1 (w/v)% aqueous solution measured using a Brookfield viscometer at 20° C. and 20 rpm, and an average particle diameter of 200 μm.

Examples 2-1 to 2-6 and Comparative Examples 2-1 to 2-5

Preparation of Tile Cement Mortar

Preparation Example 1

Preparation of Tile Cement Mortar Composition (not Adding Admixture Composition)

Cement (Asia Cement Co., Ltd., ordinary Portland cement), sand, calcium carbonate, and redispersible polymer powder (RDP, Wacker, Vinapas RE5012T) were mixed in a weight ratio of 35:59:3:3 to prepare a tile cement mortar composition not including an admixture composition.

Preparation Example 2

Addition of Admixture Composition

1% by weight of an admixture composition prepared in any one of Examples 1-1 to 1-6 and Comparative Examples 1-1 to 1-5 was added to the tile cement mortar composition prepared in Preparation Example 1 and dry mixed. This process was repeatedly applied to Examples 2-1 to 2-6 and Comparative Examples 2-1 to 2-5 while changing the type of the admixture composition.

Preparation Example 3

Preparation of Tile Cement Mortar

Water was added to each of the tile cement mortar compositions prepared in Preparation Example 2 and the resulting mixture was mixed using a mechanical mixer for 1.5 minutes to prepare a tile cement mortar. In this regard, an amount of water was adjusted such that the tile cement mortars have the same viscosity (500±50 kcps).

Evaluation Example

Physical properties of the tile cement mortars prepared in Examples 2-1 to 2-6 and Comparative Examples 2-1 to 2-5 were measured as follows, and the results are shown in Table 2 below.

(1) Water Demand

Water was added to the tile cement mortar such that the viscosity of the tile cement mortar measured by using a Brookfield viscometer was 500±50 kcps. In this regard, the total amount of water added thereto was represented as a percentage to the amount of the kneaded tile cement mortar and defined as water demand.

(2) Water Retention Capacity

Water retention capacity of the tile cement mortar was evaluated according to KSL1592. The water retention capacity is a percentage of the amount of water retained in the tile cement mortar to the total amount of water added.

(3) Sag Resistance

Sag resistance of the tile cement mortar was evaluated according to EN1308. The tile cement mortar was mixed using a mortar mixer. Sag resistance was evaluated right after the mixing (first), right after remixing (second), and right after another remixing (third). In this regard, each of the remixings was performed for 1 minute. Low sag of the tile cement mortar indicates high sag resistance.

(4) Open Time

The tile cement mortar was applied to a concrete substrate, and porcelain tiles were disposed thereon every 1 minute, pressed with a 2 Kg weight, and detached the 2 Kg weight therefrom. Here, the elapsed time before when the tile cement mortar is adhered to about 50% of a contact area of any of the tiles is defined as open time.

(7) Adhesive Strength

The tile cement mortar was applied to the concrete mortar according to EN1348, and a porcelain tile was adhered thereto after 5 minutes. 28 days later, an adhesive strength between the tile cement mortar and the porcelain tile was measured. In this regard, only dry curing was performed.

TABLE 2

| | Water demand (% by weight) | Open time (min) | Sag (mm) | | | Adhesive strength (MPa) | Water retention capacity (% by weight) |
|---|---|---|---|---|---|---|---|
| | | | First | Second | Third | | |
| Example 2-1 | 44 | 42 | 0.3 | 0.3 | 0.35 | 1.2 | 95 |
| Example 2-2 | 45 | 40 | 0.35 | 0.40 | 0.40 | 1.3 | 96 |
| Example 2-3 | 43 | 39 | 0.45 | 0.45 | 0.50 | 1.3 | 98 |
| Example 2-4 | 42 | 41 | 0.45 | 0.50 | 0.50 | 1.2 | 97 |
| Example 2-5 | 43 | 41 | 0.3 | 1.2 | 3.0 | 1.2 | 97 |
| Example 2-6 | 42 | 40 | 2.0 | 3.0 | 2.5 | 1.0 | 95 |
| Comparative Example 2-1 | 37 | 32 | 3.0 | 8.0 | slip | 0.8 | 99 |
| Comparative Example 2-2 | — | — | — | — | — | — | — |
| Comparative Example 2-3 | 26 | 15 | slip | slip | slip | 0.5 | — |
| Comparative Example 2-4 | 36 | 28 | 1.0 | 5.0 | slip | 0.6 | 96 |
| Comparative Example 2-5 | 35 | 30 | 0.6 | 0.7 | 0.7 | 0.7 | 98 |

Referring to Table 2, while sag resistance of the tile cement mortar prepared in Examples 2-1 to 2-6 was maintained even after the third mixing, the sag resistance of the tile cement mortar prepared in Comparative Examples 2-1, 2-3, and 2-4 was not maintained after the third mixing. However, the tile cement mortar prepared in Comparative Example 2-2 is too hard, and thus, properties thereof cannot be evaluated. Although the tile cement mortar prepared in Comparative Example 2-5 had better sag resistance than that prepared in Example 2-6, the water demand, open time, and adhesive strength thereof were lower than those of the tile cement mortar prepared in Example 2-6.

While the present invention has been particularly shown and described with to reference to exemplary embodiments thereof, it will be understood by those of ordinary skill in the art that various changes in form and details may be made therein without departing from the spirit and scope of the present invention as defined by the following claims.

The invention claimed is:

1. An admixture composition for a tile cement mortar comprising a cellulose ether, a polyacrylamide-based polymer coagulant, and an inorganic coagulant,
   wherein the polyacrylamide-based polymer coagulant comprises at least two types of polyacrylamide-based polymer coagulants with different average particle diameters.

2. The admixture composition of claim 1, wherein the cellulose ether comprises at least one selected from the group consisting of alkyl cellulose, hydroxyalkyl alkyl cellulose, and hydroxyalkyl cellulose.

3. The admixture composition of claim 2, wherein the cellulose ether comprises at least one selected from the group consisting of methyl cellulose, hydroxypropyl methyl cellulose, hydroxyethyl methyl cellulose, ethyl hydroxyethyl cellulose, and hydroxyethyl cellulose.

4. The admixture composition of claim 1, wherein a viscosity of an aqueous solution of the cellulose ether with a concentration of 2 (w/v) % which is measured using a Brookfield viscometer is in the range of 10 to 200,000 cps at 20° C. and 20 rpm.

5. The admixture composition of claim 1, wherein the content of the cellulose ether is in the range of 15 to 69% by weight.

6. The admixture composition of claim 1, wherein the polyacrylamide-based polymer coagulant comprises at least one compound selected from the group consisting of a nonionic polyacrylamide, a cationic polyacrylamide, and an anionic polyacrylamide.

7. The admixture composition of claim 1, wherein the polyacrylamide-based polymer coagulant comprises a small particulate polyacrylamide-based polymer coagulant having an average particle diameter in the range of 20 to 100 μm and a large particulate polyacrylamide-based polymer coagulant having an average particle diameter in the range of 150 to 250 μm in a weight ratio of 20:80 to 80:20.

8. The admixture composition of claim 1, wherein the content of the polyacrylamide-based polymer coagulant is in the range of 0.2 to 10% by weight in the admixture composition.

9. The admixture composition of claim 1, wherein the inorganic coagulant comprises at least one compound selected from the group consisting of sodium aluminate, calcium aluminate, and aluminum sulfate.

10. The admixture composition of claim 1, wherein the content of the inorganic coagulant is in the range of 21 to 85% by weight in the admixture composition.

11. A tile cement mortar composition comprising a cement and an admixture composition according to claim 1.

12. The tile cement mortar composition of claim 11, wherein the content of the admixture composition is in the range of 0.2 to 2% by weight in the tile cement mortar composition.

* * * * *